UNITED STATES PATENT OFFICE.

JONATHAN K. LIPPEN, OF BATTLECREEK, MICHIGAN, ASSIGNOR TO CHARLES KUBACH, OF BATTLECREEK, MICHIGAN.

MALTED CEREAL FOOD AND METHOD OF MAKING SAME.

SPECIFICATION forming part of Letters Patent No. 703,209, dated June 24, 1902.

Application filed September 10, 1901. Serial No. 74,970. (No specimens.)

*To all whom it may concern:*

Be it known that I, JONATHAN K. LIPPEN, a citizen of the United States, residing at Battlecreek, in the county of Calhoun and State of Michigan, have invented certain new and useful Improvements in Malted Cereal Food; and I do declare the following to be a full, clear, and exact description of the invention, such as will enable others skilled in the art to which it appertains to make and use the same.

My invention relates to what are commonly known as "malted foods"—that is, foods consisting of grain previously subjected to a more or less complete cooking process, mixed with malt, and subsequently treated to cause by the action of the diastase of the malt a partial transformation of the starch of the grain into dextrine, and subsequently drying the product; and my invention consists in the process hereinafter described for producing a food of this class and in the particular food produced by the process.

Describing my improved process in detail, I take whole wheat or other cereal which has first been thoroughly cleaned from cockle, cheat, husks, or other substances and subject it to soaking in water for twelve hours. After this soaking the grain is boiled, preferably by steam, in a closed boiler until cooked as completely as can be done without breaking the outer coating of the grain. The effect of this cooking is to rupture the starch granules, rendering them soluble and easily digested at the same time by not breaking the outer coating of the seed. The cooked grain may more readily be freed from excess of moisture than would be the case if the grain were crushed before cooking or so cooked as to break the outer coating. After this preliminary cooking the grain is freed from excess of moisture by passing it through a rotary kiln or baker's oven, and the grain thus freed from moisture is then crushed to a pulp by any convenient means, preferably by passing it between rollers. By this crushing process the cellular structure of the grain is completely broken up and disintegrated. The pulpy product is then baked in an oven at a temperature of about 300° Fahrenheit until as much as possible of the starch is changed into dextrine and the product assumes a light-brown color. The dextrinized product is then mixed in a suitable vat or trough with ten per cent. of highly diastatic barley-malt and five per cent. of water, and the mixture is passed through a mill in order to thoroughly mix and incorporate the malt and water with the dextrinized product. By this milling the resultant product is given a granular appearance. Finally this resultant product is baked to evaporate the free moisture and to render the product firm and capable of being handled. I have ascertained that this final product is composed of the following substances in about the proportions specified: gluten, eighteen per cent.; starch, thirty per cent.; maltose, eleven per cent.; dextrine, 30.50 per cent.; free fat, 1.50 per cent.; salt, 1.90 per cent.; cellulose, 1.10 per cent.; water, six per cent.; total, one hundred per cent.

The proportions will vary to some extent according to the kind of grain used.

The product is a dry granular substance capable of being kept indefinitely so long as it is kept reasonably dry. It contains all the nutritive qualities of the grain rendered palatable and readily digestible. It is delicious in flavor and may be eaten dry or with the addition of milk or cream.

Having thus described my invention, what I claim, and desire to secure by Letters Patent, is—

1. The herein-described process for preparing food from grain, which consists in first soaking the whole grain, cooking the same without breaking the outer coating, drying the cooked grain, crushing it, baking the crushed product by dry heat, adding malt and water and mixing thoroughly, and finally again baking the mixture by dry heat; substantially as described.

2. In a process for preparing food from grain, soaking the whole grain, cooking the soaked grain whole in the presence of moisture, crushing the cooked grain, baking the crushed product by dry heat, adding malt and water and granulating and finally again baking by dry heat; substantially as described.

3. The herein-described food in dry granular form, consisting of a compound analyzing about as follows: gluten eighteen, starch thirty, maltose eleven, dextrine 30.5, water six, residue 4.5.

In testimony whereof I affix my signature in presence of two witnesses.

JONATHAN K. LIPPEN.

Witnesses:
EUGENE MILLER,
CHAS. KUBACH.